PHOTOSENSITIVE SEMICONDUCTIVE JUNCTION DEVICE

Filed Feb. 3, 1961

INVENTOR
W. G. PFANN
BY [signature]
ATTORNEY

United States Patent Office
3,134,905
Patented May 26, 1964

3,134,905
PHOTOSENSITIVE SEMICONDUCTOR JUNCTION DEVICE

William G. Pfann, Far Hills, N.J., assignor to Bell Telephone Laboratories, Incorporated, New York, N.Y., a corporation of New York
Filed Feb. 3, 1961, Ser. No. 87,021
3 Claims. (Cl. 250—211)

This invention relates to a novel semiconductive photosensitive device which utilizes a photosensitive p-n junction in combination with a tunnel diode.

Recently, considerable interest has been generated in a class of semiconductive devices known as Esaki, or tunnel diodes. This device comprises an abrupt p-n junction, of the order of 100 Angstroms in thickness, at the interface of two highly doped regions and is of primary importance because it evidences a negative differential resistance over a particular range of applied bias. The size or extent of this negative resistance is dependent upon the relation between the tunneling current and the normal p-n junction current.

In accordance with this invention, a novel two-terminal device is described in which a photosensitive p-n junction is connected in parallel to a tunnel p-n junction. The resultant device may suitably be employed in circuitry utilizing tunnel diodes, thus affording control of circuit functions and light or other radiation. Alternatively, the device may be employed as a self-powered oscillator as a light sensitive switch.

The invention will be more fully understood from the following detailed description taken in conjunction with the appended drawings in which.

Figure 1:
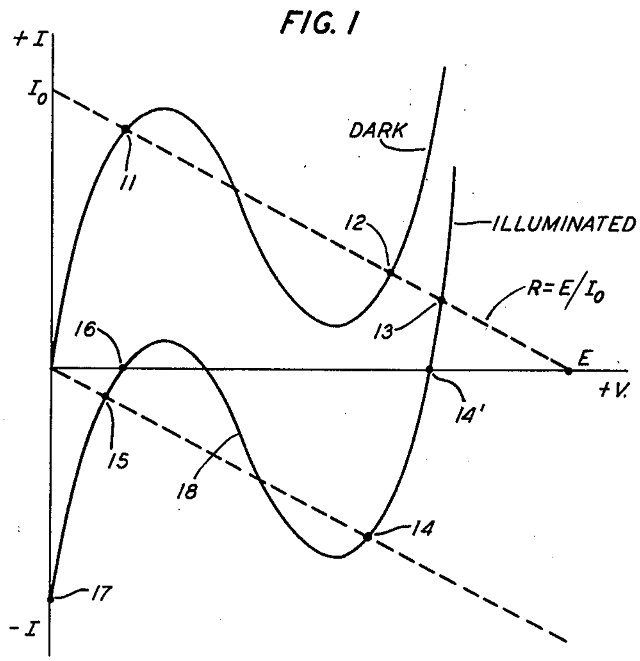
FIG. 1 is a graphical representation on coordinates of current against voltage showing the characteristics of a combined tunnel diode and photocell for normal (dark) and illuminated conditions.

Referring more particularly to FIG. 1, there is shown a graphical representation of the current voltage characteristics of a combined tunnel diode and photocell under normal or darkened conditions and when illuminated.

The illuminated curve is obtained by translating the dark curve downward on the current axis by an amount equal to the short circuit photocurrent (point 17).

As is seen from the graph in FIG. 1, parts of the lower current-voltage curve are in the fourth quadrant, signifying that such a device is capable of delivering power to a load. Thus, point 15 which is a load line through the origin indicates the power which may be delivered to a load of resistance $(E/I_0)$. More significant, however, is the existance of a negative resistance region 18 in the fourth quadrant which indicates that with the appropriate circuitry the device is capable of oscillating or amplifying with the power being supplied by the source of radiation, for example, light, an electron beam, a source of radio active emanation, etc. Thus, the device with its attendant circuit is capable of converting incoherent radiation into oscillation. The source of radiation may be regarded as a current generator in parallel with the diode and posed so as to pass current through the diode in the forward direction.

Combinations of currents from a battery and from a light source can be made to switch the tunnel diode to various stable points of its current-light-voltage characteristics, so permitting use of the diode in the illuminated state as a switch.

In FIG. 1, point 11 is the intersection of the load line and the dark current-voltage curve for a battery voltage E and a series resistance $(E/I_0)$. A pulse of light elevates point 11 to the peak current (or lowers the current voltage curve so that the peak drops below the load line) and the operating point shifts to point 12, assuming the pulse is long enough to charge up the barrier capacitance. If the light is left on, then the operating point becomes 13. If the light remains on and the battery voltage is reduced to zero, then the operating point shifts to 14. As the intensity of the light is reduced slightly and momentarily, the operating point becomes 15 whereas removal of the source of light shifts the operating point to the origin. Thus, excluding the use of short pulses, the following summary shown in Table I can be made:

TABLE I

| Battery | Light | Operating Point |
|---|---|---|
| On | Off | 11 (or 12 [1]). |
| On | On | 13. |
| Off | On | 15 (or 14 [1]). |
| Off | Off | Origin. |

[1] The battery alone can sustain point 12 and light alone can sustain point 14, but to reach either of these points requires that the battery and the light have been on together (point 13).

In conclusion of the analysis of FIG. 1, is is seen that if the series resistance is high, points 14 and 15 will be near the voltage axis (points 14' and 16). Point 16 is the open-circuit photo voltage and point 17 is the short-circuit photo current.

Figure 2:
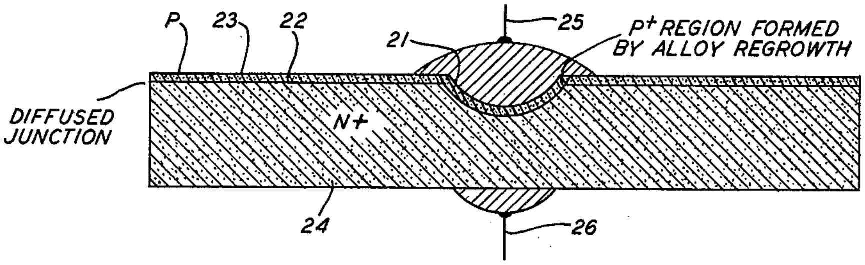
FIG. 2 is a sectional view of a combined tunnel diode and photocell fabricated in accordance with the present invention.

FIG. 2 is a sectional view of a combination, in one p-n junction of a large area high quality, photosensitive diode (similar to a solar battery cell) and a small area tunnel diode. A highly doped ($P^+$) alloy regrowth region 21 is produced in the p-type surface of a diffused large area junction 22, for example, a solar battery which is fabricated according to the technique described by D. M. Chapin in Radio-Electronics, March 1960. (The procedure described above uses a higher heat treatment temperature due to the fact that the silicon has a lower resistivity than is ordinarily employed in solar cells.) The alloy regrowth region must penetrate the diffused p-layer 23 so as to contact low resistivity n-type body 24. Tunneling occurs only through the alloy junction. Metal contacts 25 and 26 connect the solar battery and the tunnel diode in parallel.

Figure 3:
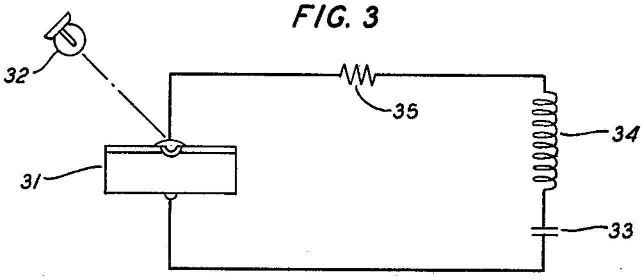
FIG. 3 is a typical series oscillating circuit utilizing the device of the present invention.

In FIG. 3 there is shown a typical series oscillating circuit utilizing the device of the present invention wherein the device 31, activated by light source 32, is connected in series with capacitance 33, inductance 34 and resistance 35. For further details see "Tunnel Diodes as High Frequency Devices" by H. S. Sommers, Jr., appearing in Proceedings of the I.R.E., July 1959, page 1201.

Thus, there is produced in accordance with the present inventive technique, a semiconductive translating device comprising a body having a region of low resistivity extending substantially through the body in two dimensions and a high resistivity region of a conductivity differing from that of the low resistivity region which also extends substantially through the body in two dimensions. These two regions form a p-n junction. The second region discussed above is situated at a free surface of the body and is of such thickness that radiation, such as visible light, impinging on the surface results in the generation of hole-electron pairs, a substantial number of which are separated by the field of the junction. Within a limited portion of free surface of the second region another low resistivity region is inserted, namely, the alloy regrowth region, and the device is completed by having a pair of electrodes making ohmic contact to the first region and the alloy regrowth region.

An example of the application of the present invention is set forth below. It is intended merely as an illustration and it is to be appreciated that the method described may be varied by one skilled in the art without departing from the spirit and scope of the present invention.

*Example*

A combined photovoltaic cell and tunnel diode is prepared as follows:

One face of a lapped single crystal wafer of phosphorus doped silicon having a resistivity less than 0.002 ohm-centimeter is coated with a suspension of boric oxide in water. After the suspension dries, the wafer is heated in air at approximately 1250° C. for a time period of the order of three hours to produce a p-type layer. Then, the back face of the wafer is lapped, plated with nickel by the electroless process and tinned with solder. The tunnel junction is made on the front face of the wafer by alloying the tip of a wire, two mils in diameter, consisting of an alloy of aluminum and 1 percent boron. The alloy regrowth region penetrates the diffused p-layer so as to contact the n-type body. Next, a pair of electrodes is connected to the alloy regrowth region and the n-type surface of the wafer.

The bistable current-voltage characteristics of the device fabricated in accordance with the invention make logic applications feasible. Stable operating points in either of the two positive resistance branches can be identified with the logical states "zero" and "one." Switching from one state to the other state can be achieved by a small overdrive.

While the invention has been described in detail in the foregoing description, the aforesaid is by way of illustration only and is not restrictive in character. The several modifications which will readily suggest themselves to persons skilled in the art are all considered within the broad scope of this invention, reference being had to the appended claims.

What is claimed is:

1. A semiconductive translating device comprising a body having a low resistivity region of a first type extending substantially through the body in two dimensions, a high resistivity region of a second conductivity type also extending substantially through the said body in the said two dimensions and forming a p-n junction with said first region, the said second region being situated at a free surface of the said body and being of such thickness that radiation impinging on the said surface results in the generation of hole-electron pairs, means for applying radiation to said second region, whereby hole-electron pairs are generated, a substantial number of which are separated by the field of the said junction, said second region being interrupted over a limited portion of its free surface by a second low resistivity region of the said second conductivity type together with a pair of electrodes, the first electrode making ohmic contact to the said second low resistivity region and the second electrode making ohmic contact to the said first region.

2. The device of claim 1 wherein the said radiation is visible light.

3. The device of claim 1 wherein said body comprises a single crystal wafer of phosphorus doped silicon having a diffused p-layer containing excess boron in solid solution.

References Cited in the file of this patent

UNITED STATES PATENTS

| | | |
|---|---|---|
| 2,846,592 | Rutz | Aug. 5, 1958 |
| 2,944,165 | Stuetzer | July 5, 1960 |
| 2,962,605 | Grosvalet | Nov. 29, 1960 |
| 3,064,132 | Strull | Nov. 13, 1962 |
| 3,079,512 | Rutz | Feb. 26, 1963 |

OTHER REFERENCES

Lesk et al.: Electronics; November 27, 1959; vol. 32, No. 48; pp. 60–64.

Miller: IBM Technical Disclosure Bulletin; vol. 3, No. 4; p. 38; Sept. 30, 1960.